United States Patent [19]

Baxter et al.

[11] Patent Number: 4,930,120
[45] Date of Patent: May 29, 1990

[54] SIGNAL DISTRIBUTION NETWORK SYSTEM

[75] Inventors: Thomas Baxter, Westerham; Robert A. Barnes, Wallington, both of England

[73] Assignee: U.S. Philips Corporation, New York, N.Y.

[21] Appl. No.: 298,537

[22] Filed: Jan. 18, 1989

[30] Foreign Application Priority Data

Jan. 22, 1988 [GB] United Kingdom ............... 8801441

[51] Int. Cl.⁵ .......................... H04H 1/08; H04J 1/02
[52] U.S. Cl. .................................... 370/73; 370/124; 455/4; 455/6; 358/86
[58] Field of Search ................. 370/69.1, 73, 76, 124, 370/110.1; 379/101; 358/86, 181, 194.1; 455/3, 4, 5, 6, 68, 69, 70

[56] References Cited

U.S. PATENT DOCUMENTS 4,488,179 12/1984 Krüger et al. ..................... 358/181
4,527,204 7/1985 Kozakai et al. ................. 358/194.1
4,656,629 4/1987 Kondoh et al. ........................ 455/4
4,698,670 10/1987 Matty ................................. 358/86
4,787,085 11/1988 Suto et al. .................... 370/110.1 X Primary Examiner—Douglas W. Olms
Assistant Examiner—Wellington Chin
Attorney, Agent, or Firm—Robert T. Mayer

[57] ABSTRACT

A signal distribution cable network system in which frequency division multiplexing is employed to provide a plurality of information channels. A channel allocation controller (CT) allocates free channels on request for the transport of signals from a local signal source (SS1, SS2, SS3) to a signal destination receiver (SR1, SR2, SR3) connected to the network. The local signal source includes a programmable modulator (CFS, VCO, MOD) which is set by the channel controller (CT) to operate at the carrier frequency of the selected channel. The signal level of the signals transmitted by the local signal source is measured in the controller and adjusted to compensate for signal attenuation by a command signal sent by the controller to the programmable modulator in the local signal source.

6 Claims, 2 Drawing Sheets

SIGNAL DISTRIBUTION NETWORK SYSTEM

This invention relates to signal distribution network systems in which information signals from different signal sources are transported in separate information channels which are provided in a common transmission medium.

The invention relates more particularly to signal distribution network systems of a type in which the common transmission medium is a cable and in which frequency division multiplexing is employed to provide a plurality of information channels which are defined by respective carrier frequencies.

There is proposed for a domestic environment a signal distribution coaxial cable network system which is capable of providing a plurality of information channels suitable for transporting a wide range of information signals, including UHF television signals and FM radio signals, together with associated high and low speed control signals. Some signal sources which feed the network will be external to the domestic environment (e.g. terrestrial broadcast and cable television stations and FM radio stations) and other signal sources will be local sources (e.g. a video tape player/recorder, a video camera and a compact disc player) which are connected to the network cable.

Such a network system will thus be required to transport both externally and locally generated information signals to different signal destination receivers connected to the network cable with an acceptable signal quality, together with the transport of control signals for selecting the information signals required at different signal destination receivers. Applicants copending U.S. patent application Ser. No. 296,461 filed Jan. 12, 1989 and corresponding United Kingdom patent application No. 8801440 provides a signal distribution cable network for a system of the type set forth above in which information channel allocation for achieving this transport of both externally and locally generated information signals is accomplished in an advantageous manner. In this network, for the transport of information signals from external signal sources there is the permanent allocation of respective information channels whose carrier frequencies are the same as the carrier frequencies of these external signal sources, and for the transport of information signals from any local signal source which is to transmit there is the temporary allocation of an unused channel from all the remaining unused channels in which the prevailing signal level is less than a given value.

With this network, a number of local signal sources connected to the network cable can share a lesser number of the remaining unused channels in an efficient manner. For transporting UHF signals, the network includes a channel allocation controller which is operable on request to allocate temporarily an unused channel for the transport of information signals from a local UHF signal source to a signal destination receiver connected to the network, the controller including means for transmitting tuning command signals to the local UHF signal source and signal destination receiver to cause them to be tuned to the carrier frequency of the allocated channel. The controller is also operable to exclude from further allocation whilst the channel is in use by the local UHF signal source, the allocated channel and other channels which may be prone to interference from the allocated channel.

Existing television receivers already include means responsive under user control to tune them to different channels and these can be readily adapted to respond to the tuning signals from the controller. However, existing UHF local signal sources such as video tape recorder/players are arranged to transmit in a single information channel only so that they cannot be tuned selectively to transmit in other information channels.

It is an object of the present invention to seek to overcome this problem in a simple manner.

The invention provides a signal distribution cable network system in which frequency division multiplexing is employed to provide a plurality of information channels which are defined by respective carrier frequencies, said network system comprising a channel allocation controller which is operable on request to allocate temporarily an unused channel for the transport of information signals from a local signal source to a signal destination receiver connected to the network, the controller including means for transmitting tuning command signals to the local signal source and signal destination receiver to cause them to be tuned to the carrier frequency of the allocated channel, and said network system being characterised in that the local signal source includes a programmable modulator arrangement comprising a first input connected to receive tuning command signals from the controller, a second input connected to receive baseband video/audio signals generated by the local signal source, a frequency generator which is responsive to a tuning command signal pertaining to a selected channel carrier frequency to produce a carrier signal of that frequency, and a modulator connected to receive said carrier signal and said baseband video/audio signals and responsive to produce a modulated carrier signal for transport over the selected channel.

Such a network system has the advantage that local signal sources can readily have their carrier frequencies selected in such manner that duplication is avoided.

Another problem which is encountered with a signal distribution cable network system is the attentuation of the information signals in the network cable itself and also at the connection points (taps) of the local signal sources and signal destination receivers to the network cable. An information signal arriving at a television receiver should not be so weak that noise in the channel transporting it results in an unacceptable signal-to-noise ratio, nor so strong that the tuner in the television receiver is overloaded. Also, there are limits on the relative strengths of different information signals which are transported over a common network cable.

The strength of an information signal arriving at a television receiver is determined by the output of the programmable modulator arrangement of the local signal source generating the information signal, and the length of network cable and the number of taps along it between the local signal source and the television receiver. Therefore, setting empirically to a common fixed value the output of the modulator in each local signal source connected to the network cable imposes a limit on the network configuration. Alternatively, setting the output of these modulators to respective fixed values according to the network configuration increases the complexity of the system on installation.

This other problem can be overcome in a simple manner when the invention is characterised in that the network cable comprises an upstream section to which the local signal sources are connected and a downstream section to which the signal destination receivers are connected; in that the controller includes means for providing a one-way information signal path from the upstream cable section to the downstream cable section; in that the controller further includes means for determining the strength of an information signal generated by a local signal source and means for transmitting to the local signal source concerned a level command signal; and in that the local signal source includes signal level means responsive to the level command signal to adjust the strength of the information signal generated by it.

With this aspect of the invention the controller is able to monitor the strength of the information signals produced by the modulators of the local signal sources so as to obtain an optimum level of information signal as well as selecting an information channel for its transport. Of course, only the signal attenuation in the upstream section is taken into account, but it is thought this will be sufficient to significantly increase the network system.

The signal level means in each local signal source can be a voltage controlled amplifier which is connected at the output of the modulator, together with digital-to-analogue converter means connected to receive a digital level command signal from the controller and operable to produce a corresponding control voltage for controlling the signal output level of the amplifier.

A serial digital data link included in the network system can use the network cable for the transmission of digital command and control signals between the controller and the local signal sources and improve destination receivers.

The present invention also provides invidually for use in a system as set forth above a controller and a local signal source and associated programmable modulator.

In further considering the nature of the invention, reference will now be made by way of example to the accompanying drawing, of which;

Figure 1:
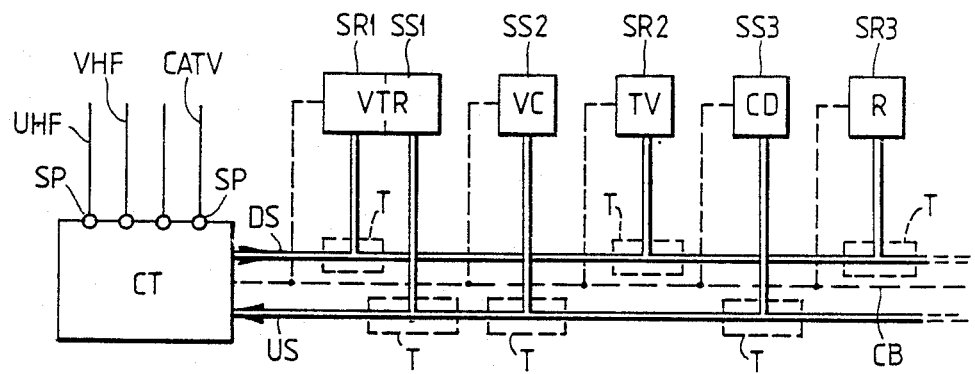
FIG. 1 shows diagrammatically a signal distribution cable network system according to the invention.

Referring to the drawing, the signal distribution cable network system shown in FIG. 1 is assumed to be for a domestic environment and has a coaxial cable as a transmission medium. This coaxial cable comprises a downstream section DS for the transport of information signals in a direction from a controller CT to a plurality of signal destination receivers SR1, SR2, SR3, etc., and an upstream section US for the transport of information signals in the opposite direction from local signal sources SS1, SS2, SS3, etc. Taps T are provided on the coaxial cable for the connection of the signal destination receives and local signal sources to the relevant cable section. The controller CT provides a connection between the coaxial cable downstream and upstream sections DS and US. The controller CT also provides for the connection to the downstream section DS of a plurality of signal ports SP at which information signals from external signal sources can be received.

As indicated in FIG. 1, the combined signal destination receiver/signal source SR1/SS1 is assumed to be a video tape recorder device VTR, the signal source SS2 is assumed to be a video camera device VC, the signal destination receiver SR2 is assumed to be a television receiver device TV, the signal source SS3 is assumed to be a compact disc player device CD and the signal source SR3 is assumed to be a radio receiver device R. Further, the information signals from external signal sources received at the ports SP are assumed to be UHF television signals, VHF radio signals, and CATV cable television signals. The information signal at the remaining port SP is unspecified.

The signal distribution coaxial cable as comprised by the upstream and downstream sections US and DS provides a predetermined number of information channels which are defined by respective carrier frequencies, each information channel having a given bandwidth around the appertaining carrier frequency. These information channels can be used for selective transport of both externally generated and locally generated information signals to appropriate signal destination receivers. However, for the purposes of the present description, only this allocation as applied to information channels selected for the transport of UHF video signals will be considered, but it will be apparent to persons skilled in the art that the principle of the invention can be extended to include channel allocation for other forms of information signals. Also for the purposes of the present description it will be assumed that a plurality of the information channels are available for the transport of locally generated information signals.

The information channels used by external UHF video signals that can be received at a location where the signal distribution coaxial cable network is provided are used within the network for the transport of these UHF television signals therein, and these information channels are excluded for allocation for the transport of information signals produced by any of the local signal sources. Certain criteria for determining channel availability for the transport of locally generated information signals can be as described in Applicants co-pending patent applications mentioned above.

Figure 2:
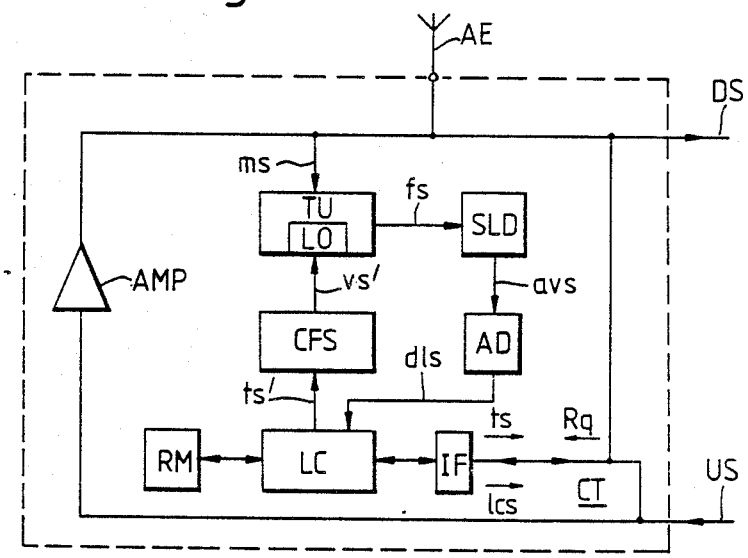
FIG. 2 shows diagrammatically a channel allocation controller for use in the network system of FIG. 1.

The controller CT (FIG. 1) may be implemented as shown diagrammatically in FIG. 2. The controller CT comprises a logic device LC together with associated read/write random-access memory RM, a channel frequency selector CFS, a UHF tuner TU with a local oscillator LO, a signal level detector SLD, an analogue-to-digital converter AD, an interface IF and an amplifier AMP.

The controller CT may be implemented using commercially available circuit components and devices. For instance, the Computer Interface for Tuning and Control (CITAC) integrated circuit type SAB 3037 (Philips) which is controlled by a two-wire bi-directional I²C bus (not shown); and the tuner TU can be a UHF television tuner type U744 (Philips). The signal level detector can be an analogue voltage comparator circuit of known form. An amplifier device AMP provides one-way signal isolation between the upstream and downstream coaxial cable sections US and DS. The logic device LC is operable to send digital channel tuning signals ts' to the channel frequency selector CFS which is responsive to a command signal to apply to the tuner TU a tuning signal vs' which tunes the local oscillator LO to the selected UHF channel frequency.

The converter AD provides conventional digitial-to-analogue conversion of an analogue voltage signal avs produced by the signal level detector SLD as will be described. The interface device IF effects connection between the logic device LC and the coaxial cable sections DS/US for the transmission and reception of control signals to and from the local signal sources SS and the signal destination receivers SR. Alternatively, as indicated in broken line in FIG. 1, a separate control bus CB can be provided for these control signals. The control signals to be transmitted may be from the RC5 command signal range which is extensively used in the act for the remote control of television receivers and video tape recorder/players by means of IR remote control units.

There is included in the memory RM a table of all the UHF channels which are available for the transport of locally generated information signals. In the table a flag for each channel indicates whether or not the channel is available at any time for allocation as a local channel.

A typical operating sequence for the allocation of a free channel for the transport of information signals from the local signal source SS1 (VTR) to the signal destination receiver SR2 (TV) may be as follows, based on the premise that both the receiver and the source include a computer/channel frequency selector/UHF tuner combination of conventional form.

A user of the receiver SR2 transmits from his remote control unit a request signal for receiving the program available in the source SS1. The request signal Rq is received at the interface IF of the controller CT and fed to the logic device LC which is responsive to this request signal to allocate a free channel from the memory RM. The number of the resulting allocated channel N is transmitted to both the source SS1 and the receiver SR2 as a tuning signal ts and is utilised therein to tune the apparatus to the carrier frequency of the allocated channel. The receiver SR1 has a control interface link with the coaxial cable (or control bus), and is set to operate at the carrier frequency of the allocated channel.

Figure 3:
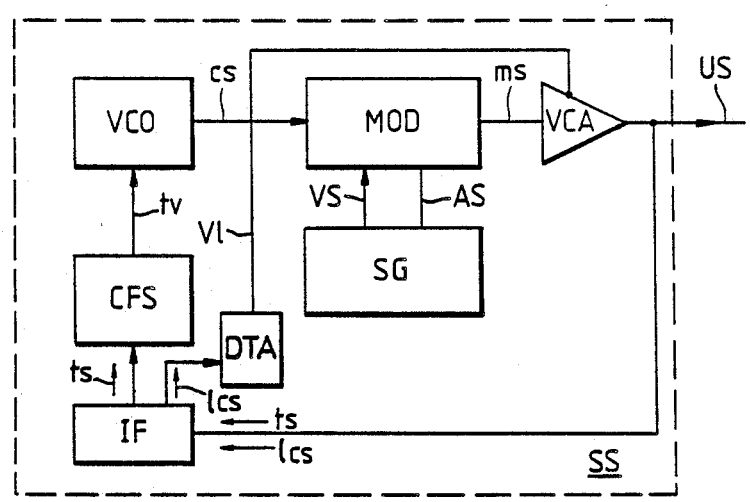
FIG. 3 shows diagrammatically a local signal source and associated programmable modulator for use in the network system of FIG. 1.

As regards the source SS1 this has included therein a modulator which can be programmed to operate at the carrier frequency of the allocated channel. FIG. 3 is a block diagram of a local signal source SS including a modulator arrangement in which a programmable modulator is provided. The local signal source comprises an information signal generator SG for producing a video signal VS and a related audio signal AS. The video signal VS is a composite video baseband signal including conventional blanking and synchronising information. The signals VS/AS are applied to a modulator MOD which is also fed with a carrier signal cs the frequency of which is determined by a voltage controlled oscillator VCO. A channel frequency selector CFS applies a tuning voltage tv to the oscillator VCO to set it to a required carrier frequency. The source SS is connected to the upstream cable section US by an interface IF and receives the tuning signal ts from the controller CT via this interface. The channel frequency selector CFS is responsive to the tuning signal ts to produce the appropriate value of tuning voltage tv to tune the oscillator VCO to the required carrier frequency. The modulator output signal ms produced by the modulator MOD is applied by way of a voltage controlled amplifier VCA to the network cable upstream section US over which it is fed to the controller CT. When the tuning signal ts is produced by the logic device LC, a corresponding tuning signal ts' is applied by it to the channel frequency selector CFS (FIG. 2). This results in the production of tuning voltage vs' which tunes the tuner TU to the channel in which the modulated signal ms produced by the source SS is transported. The level of the resulting intermediate frequency signal fs produced at the output of the tuner TU is detected by the signal level detector SLD and a voltage avs representing this level is fed to the analogue-to-digital converter AD. The digital level signal dsl fed from the converter AD to the logic device LC causes the latter to produce a digital level control signal lcs which is fed to the source SS over the network cable control link. A digitial-to-analog converter DTA in the source SS converts the signal lcs to a voltage control signal vl which adjusts the level of the voltage controlled amplifier VCA (FIG. 3). In this way, the correct signal level at the controller CT is achieved and hence the dynamic range due to positioning of signal sources at attentuation extremes of the upstream cable section US is eliminated, and attenuation limits are now only applicable in respect of the downstream cable section.

In the source SS the channel frequency selector CFS can be of the same form as the channel frequency selector CFS in the controller CT. The modulator can be based on the Philips modulator type TDA5660.

From reading the present disclosure, other modifications will be apparent to persons skilled in the art. Such modifications may involve other features which are already known in the design, manufacture and use of systems and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applications hereby give notice that new claims may be formulated to such features and/or combinations of such features during the prosecution of the present application or of any further application derived therefrom.

We claim:

1. A signal distribution cable network system in which frequency division multiplexing is employed to provide a plurality of information channels which are defined by respective carrier frequencies, said network system comprising a channel allocation controller which is operable on request to allocate temporarily an unused channel for the transport of information signals from a local signal source to a signal destination receiver connected to the network, the controller including means for transmitting tuning command signals to the local signal source and signal destination receiver to cause them to be tuned to the carrier frequency of the allocated channel, and said network system being characterised in that the local signal source includes a programmable modulator arrangement comprising a first input connected to receive tuning command signals from the controller, a second input connected to receive baseband video/audio signals generated by the local signal source, a frequency generator which is responsive to a tuning command signal pertaining to a selected channel carrier frequency to produce a carrier signal of that frequency, and a modulator connected to receive said carrier signal and said baseband video/audio signals and responsive to produce a modulated carrier signal for transport over the selected channel.

2. A distribution cable network system as claimed in claim 1, characterised in that the network cable comprises an upstream section to which the local signal sources are connected and a downstream section to which the signal destination receivers are connected; in that the controller includes means for providing a one-way information signal path from the upstream cable section to the downstream cable section; in that the controller further includes means for determining the strength of an information signal generated by a local signal source and means for transmitting to the local signal source concerned a level command signal; and in that the local signal source includes signal level means responsive to the level command signal to adjust the strength of the information signal generated by it.

3. A signal distribution cable network system as claimed in claim 2, characterised in that the signal level means in each local signal source is a voltage controlled amplifier which is connected at the output of the modulator, together with digital-to-analogue converter means connected to receive a digital level command signal from the controller and operable to produce a corresponding control voltage for controlling the signal output level of the amplifier.

4. A signal distribution cable network system as claimed in any preceding claim, characterised in that a serial digital data link included in the network system uses the network cable for the transmission of digital command and control signals between the controller and the local signal sources and signal destination receivers.

5. A channel allocation controller for a signal distribution cable network system as claimed in any preceding claim.

6. A local signal source and associated programmable modulator for a signal distribution cable network system as claimed in any one of claims 1 to 4.

* * * * *